July 13, 1965  S. S. KAHN  3,193,858
METHODS OF PRODUCING STRONG THREADED ANCHORAGES
Filed March 24, 1961  2 Sheets-Sheet 1

INVENTOR.
Simon S. Kahn
BY Prangley, Baird, Clayton,
Miller & Vogel
ATTYS.

July 13, 1965    S. S. KAHN    3,193,858
METHODS OF PRODUCING STRONG THREADED ANCHORAGES
Filed March 24, 1961    2 Sheets-Sheet 2
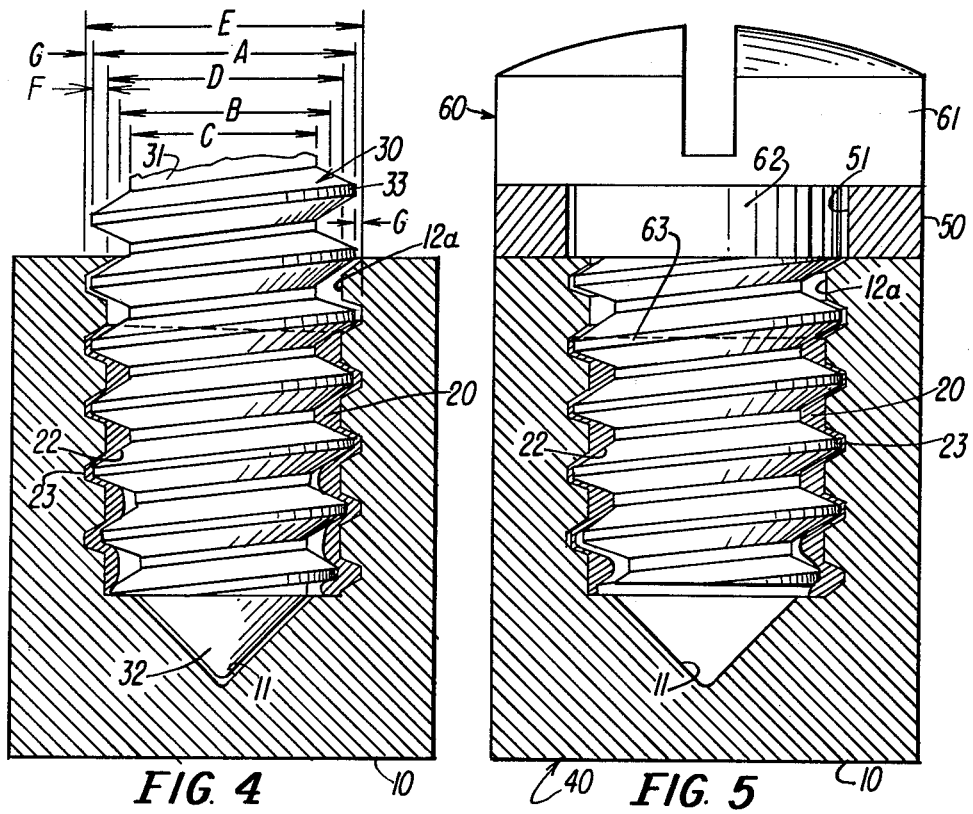
FIG. 4
FIG. 5
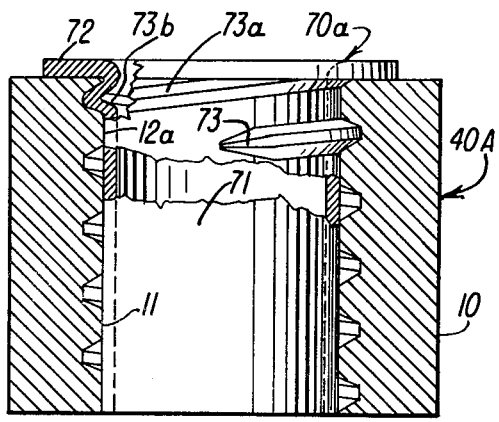
FIG. 6
INVENTOR.
Simon S. Kahn
BY
Brangley, Baird, Clayton,
Miller & Vogel
ATTYS.

United States Patent Office 3,193,858
Patented July 13, 1965

3,193,858
METHODS OF PRODUCING STRONG
THREADED ANCHORAGES
Simon S. Kahn, Glen Ridge, N.J., assignor to General American Transportation Corporation, Chicago, Ill., a corporation of New York
Filed Mar. 24, 1961, Ser. No. 98,124
10 Claims. (Cl. 10—1)

The present invention relates to methods of producing a strong threaded anchorage in a workpiece formed of relatively hard metal.

It is a general object of the invention to provide an improved and simplified method of producing a strong threaded anchorage in a workpiece of the character noted that involves the incorporation into the workpiece of an insert formed of relatively soft metal and securely anchored in place within a threaded bore provided in the workpiece, the insert being provided with an internal thread that is adapted to receive and to engage a cooperating external thread carried upon the shank of a screw, or the like, so that another part may be readily and securely anchored or fastened to the workpiece.

Another object of the invention is to provide a method of the character noted, wherein an internal thread-like structure is first provided upon the workpiece interiorly of a bore formed therein, a ferrule formed of relatively soft metal characterized by plastic flow under swaging pressure is then inserted into the bore and secured in place, and then the interior surface of the ferrule is subjected to swaging pressure with an extremely hard thread-swaging member so as simultaneously to swage an internal thread upon the interior surface of the ferrule and to swage an external thread-like structure upon the exterior surface of the ferrule, wherein the thread-like structures are complementary and disposed in interlocked frictional engagement with each other so as securely to anchor the ferrule, as an insert, in place in the bore, and wherein the internal thread is adapted to receive and to engage a cooperating external thread carried upon the shank of a screw, or the like, for the fastening purpose.

A further object of the invention is to provide a method of the character described, wherein desired and advantageous relations are effected between the major and minor diameters of the internal thread and the corresponding major and minor diameters of both the external thread-like structure and the internal thread-like structure.

A further object of the invention is to provide a method of the character described, wherein the internal thread and the pair of complementary thread-like structures have the same pitch and are disposed in phase with each other.

A further object of the invention is to provide a method of the character described that readily lends itself to the repairing of a damaged internal thread previously provided upon the workpiece interiorly of a bore formed therein, whereby the ultimately produced new internal thread in the insert that is produced from the ferrule mentioned has the same size and dimensions as the original damaged internal thread provided upon the workpiece interiorly of the bore formed therein.

Further features of the invention pertain to the particular arrangement of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 4 is another side elevational view, partly in section, of the workpiece and the thread-swaging member, illustrating the thread-swaging actions of the thread-swaging member upon the ferrule that is inserted in the bore in the workpiece;

Figure 3:
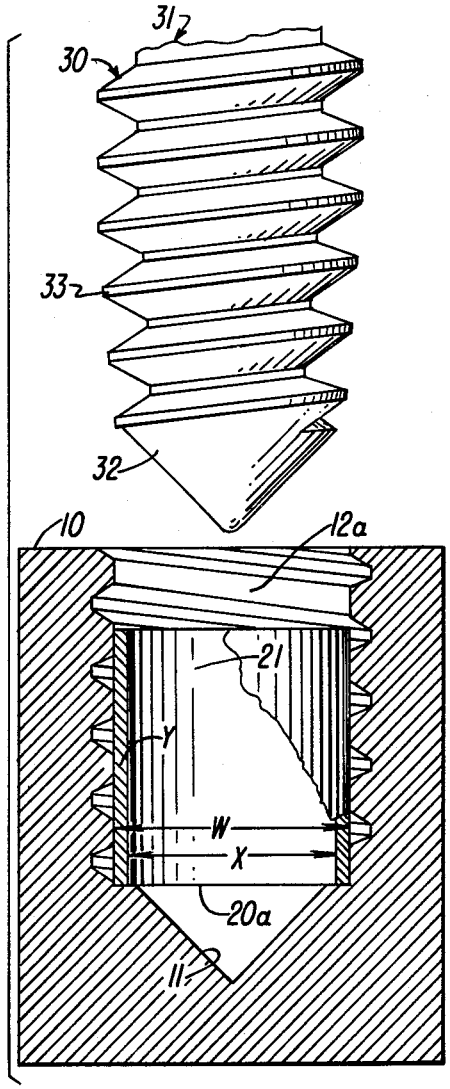
FIG. 3 is an exploded side elevational view, partly in section, illustrating the workpiece after the insertion of a ferrule therein and also illustrating the cooperating thread-swaging member that is employed for the purposes of anchoring the ferrule in place in the bore in the workpiece and of forming the internal thread therein.

FIG. 5 is a further side elevational view, partly in section, of the finished article of manufacture, including the workpiece and the insert anchored in place in the internal threaded bore therein, and further illustrating the utility of the assembly to secure a plate thereto by a cooperating screw fastener; and FIG. 6 is a reduced side elevational view, partly in section and partly broken away, similar to the lower portion of FIG. 3, and illustrating a modified form of the ferrule that may be inserted in the threaded bore provided in the workpiece and subsequently worked by the cooperating thread-swaging member in order to produce a finished article of manufacture substantially identical to that of FIG. 5.

Figure 1:
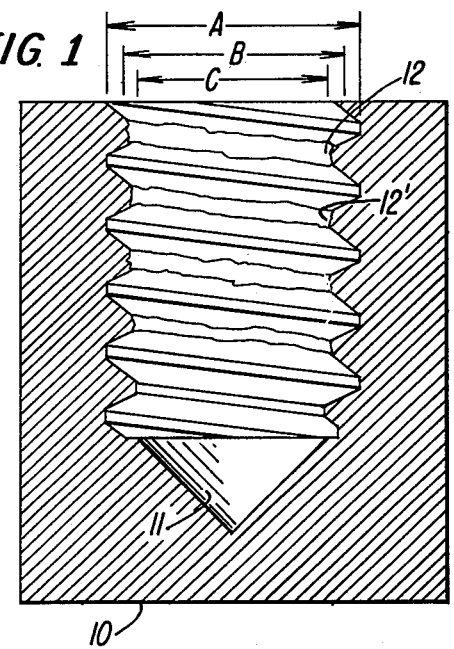
FIGURE 1 is a vertical sectional view of a workpiece provided with a blind bore therein and carrying a damaged internal thread that may be repaired or employed in the present method in making the anchorage of the present construction.

Referring now to FIG. 1, there is shown a work-piece 10 that is formed of relatively hard solid material, such for example, as cast iron and having a blind bore 11 provided therein that is provided with an internal thread 12. As illustrated, the internal thread 12 may have a major diameter, indicated as "A," a pitch diameter, indicated as "B," and a minor diameter, indicated as "C"; and the internal thread 12 may be damaged, as indicated at 12'.

Figure 2:
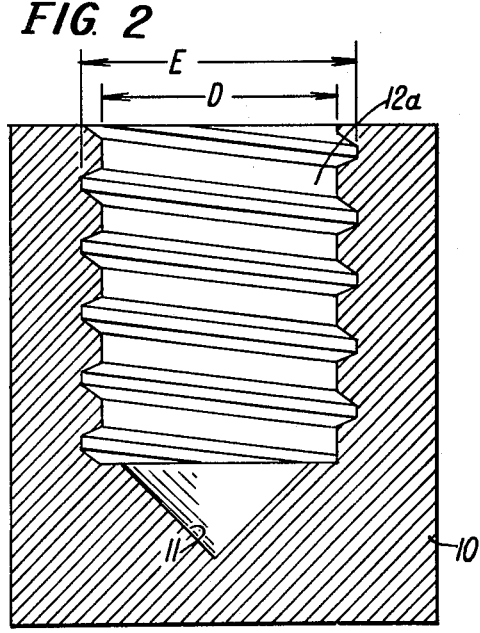
FIG. 2 is another vertical sectional view of the workpiece of FIG. 1 following initial steps in the method, wherein the workpiece is both rebored and rethreaded to larger diameters.

In order to repair the damaged internal thread 12 in accordance with the present method, the blind bore 11 is rebored or bored-out to a larger diameter, indicated as "D" in FIG. 2, and also the blind bore 11 is retapped or tapped-out to a larger major diameter, indicated as "E" in FIG. 2. Accordingly, at this time, the workpiece 10 is provided with a blind bore 11 carrying the internal thread-like structure 12a having the major diameter "E" and the minor diameter "D," as illustrated in FIG. 2.

Referring to FIG. 3, there is provided a ferrule 20a formed of relatively soft metal that is characterized by plastic flow under swaging pressure, such, for example, as stainless steel. The ferrule 20a may have an external diameter, indicated as "W," that is slightly larger than the minor diameter "D" of the internal thread-like structure 12a; whereby the ferrule 20a is frictionally secured in place when it is inserted into the internal thread-like structure 12a and forced into the bottom of the blind bore 11. Further, the interior opening 21 provided in the ferrule 20a may have an initial internal diameter, indicated as "X," whereby the ferrule 20a has an initial wall thickness, indicated as "Y."

In accordance with the present method, the ferrule 20a, after it is secured in place in the internal thread-like structure 12a provided in the workpiece 10, is subsequently worked utilizing a fluteless thread-swaging tap 30 that may be of the construction and arrangement of that disclosed in U.S. Reissue Patent No. 24,572, granted on December 2, 1958 to Donald P. Welles, Jr. The tap 30 is formed of extremely hard material, such as hardened steel, and comprises a shank 31 terminating in a point 32 and carrying an external thread 33 upon the exterior surface thereof. As disclosed in the Welles patent mentioned, the external thread 33 is continuous along the exterior surface of the shank 31 and is formed of a series of successively radially relieved sectors circumferentially of the shank 31, the external thread 33 being substantially uniform in cross-section and of substantially equal depth taken in all planes intersecting the axis of the shank 31 longitudinally thereof, wherein the radially relieved sectors of the external thread 33 have gradually increasing outside and pitch and root diameters merging gradually into gradually decreasing outside and pitch and root diameters. More particularly, in this tap 30, three of the radially relieved sectors are provided about the circumference of the shank 31 and disposed in substantially equally angularly spaced-apart relation of approximately 120°.

Continuing with the present method, it is pointed out that the initial length of the ferrule 20a is somewhat less than the depth of the blind bore 11 provided in the workpiece 10, so that when the ferrule 20a is secured in place in the blind bore 11, at least one of the elements of the internal thread-like structure 12a provided in the workpiece 10 is exposed adjacent to the outer end of the blind bore 11, as illustrated in FIG. 3; which arrangement accommodates cooperation between the thread 33 provided on the shank 31 of the thread-swaging tap 30 and the exposed element of the internal thread-like structure 12a during the initial working of the ferrule 20a by the thread-swaging tap 30, so as to prevent cross-threading or damage to the internal thread-like structure 12a provided in the workpiece 10 in this working operation by the thread-swaging tap 30.

Continuing with the present method, the tapered end 32 of the thread-swaging tap 30 is inserted into the outer open end of the ferrule 20a, whereupon the tap 30 is pressed home and rotated carefully so as to cause the previously described cooperation between the thread 33 provided adjacent to the outer end of the shank 31 of the tap 30 and the exposed element of the internal thread-like structure 12a positioned exteriorly of the outer end of the ferrule 20a. This causes the thread 33 carried by the shank 31 of the tap 30 to be in phase with the internal thread-like structure 12a, so as to prevent cross-threading or damage thereof incident to further rotation and the final thread-swaging action of the tap 30 upon the ferrule 20a. More particularly, the tap 30 is rotated into its final home position, as shown in FIG. 4; whereby the ferrule 20a is coined between the workpiece 10 and the thread-swaging tap 30 to produce the insert, as indicated at 20. More specifically, the thread 33 carried by the shank 31 of the tap 30 subjects the interior surface of the ferrule 20a to swaging pressure, so as simultaneously to swage the internal thread 22 upon the interior surface of the resulting insert 20 and to swage the external thread-like structure 23 upon the exterior surface of the insert 20. In this action, not only are the internal thread 22 and the external thread-like structure 23 formed simultaneously, but the external thread-like structure 23 is simultaneously swaged into interlocked frictional engagement with the internal thread-like structure 12a provided in the blind bore 11 formed in the workpiece 10, so as securely to anchor the insert 20 in place in the bore 11, as the insert 20 is coined in situ from the ferrule 20a. In this coining of the insert 20, from the ferrule 20a, the metal of the ferrule 20a flows radially outwardly from the exterior surface of the ferrule 20a to produce the roots of the internal thread 22 and flows radially inwardly from the interior surface of the ferrule 20a to produce the crests of the internal thread 22, by virtue of the plastic flow of the metal in contact with the extremely hard thread 33 carried upon the exterior surface of the shank 31 of the thread-swaging tap 30. Also, in this coining of the insert 20 from the ferrule 20a, the metal of the ferrule 20a flows radially outwardly from the exterior surface of the ferrule 20a to produce the crests of the external thread-like structure 23 forced into firm interlocked relation with the roots of the internal thread-like structure 12a carried by the workpiece 10.

These relationships may be readily understood from the nomenclature applied to FIG. 4, wherein it will be observed that the major diameter of the internal thread-like structure 12a is indicated as "E," the minor diameter of the internal thread-like structure 12a is indicated as "D," the major diameter of the internal thread 22 is indicated as "A," the pitch diameter of the internal thread 22 is indicated as "B," the minor diameter of the internal thread 22 is indicated as "C," the major diameter of the external thread-like structure 23 is indicated as "E," and the minor diameter of the external thread-like structure 23 is indicated as "D." Also, the thread 33 carried by the shank 31 of the thread-swaging tap 30 has a minor diameter indicated as "C," a pitch diameter indicated as "B" and a major diameter indicated as "A," all corresponding to the minor diameter, the pitch diameter and the major diameter of the internal thread 22. Further, the insert 20 has a wall thickness between the root of the internal thread 22 and the adjacent crest of the internal thread-like structure 12a indicated as "F," and a wall thickness between the root of the internal thread 22 and the adjacent root of the internal thread-like structure 12a indicated as "G."

In these relationships, it will be observed that the major diameter "A," the pitch diameter "B" and the minor diameter "C" of the internal thread 22 provided in the insert 20 correspond to the same items of the damaged thread 12 that were initially provided in the workpiece 10, as shown in FIG. 1; whereby the internal thread 22 is adapted to receive a screw, or the like, of the same size as was the original damaged thread 12 in the workpiece 10. Further in these relationships, it will be appreciated that the internal thread 22, the external thread-like structure 23 and the internal thread-like structure 12a have the same pitch and are in phase with each other, as previously noted. Furthermore, the major diameter "A" of the internal thread 22 is somewhat greater than the minor diameter "D" of the internal thread-like structure 12a so that the crests of the external thread provided upon a screw, or the like, received in the internal thread 22 provided in the insert 20, are disposed intermediate the minor diameter "D" and the major diameter "E" of the internal thread-like structure 12a. Thus, the internal thread-like structure 12a has a major diameter "E" that is greater than the minor diameter "D" of the external thread-like structure 23; the external thread-like structure 23 has a major diameter "E" that is substantially equal to the major diameter "E" of the internal thread-like structure 12a; and the external thread-like structure 23 has a minor diameter "D" that is substantially equal to the minor diameter "D" of the internal thread-like structure 12a. Further, the insert 20 has a length between the opposite ends thereof that is greater than the major diameter "A" of the internal thread 22, so as to improve the holding effect of the cooperating screw that is ultimately employed in engagement with the internal thread 22; and normally a minimum figure of 1½ : 1 is recommended as a ratio between the overall length of the internal thread 22 and the major diameter "A" thereof.

Of course, it will be understood that the particular form of the internal thread 22 that is produced in the interior surface of the insert 20 is dependent upon the form of the thread 33 carried upon the shank 31 of the thread-swaging tap 30; and various thread forms may be readily obtained by utilizing the different ones of the thread-swaging taps 30 that are manufactured and sold commercially by the Besly-Welles Corporation. While the particular form of the internal thread 22 is determined by the particular form of the thread 33 provided on the shank 31 of the thread-swaging tap 30, as noted above, the configuration of the external thread-like structure 23 is determined by the configuration of the internal thread-like structure 12a and is more or less independent of the particular form of the thread 33, since the exterior thread-like structure 23 is produced by plastic flow of the metal of the ferrule 20a into the previously established configuration of the internal thread-like structure 12a. Also, it is noted that the internal thread 22 and the two complementary thread-like structures 23 and 12a are of the same pitch and in phase with each other, regardless of the particular form of the thread 33 carried by the shank 31 of the thread-swaging tap 30. This relationship necessarily exists by virtue of the fact that it is the crest of the thread 33, regardless of the form thereof, that produces the fundamental swaging pressure and the consequent plastic flow of the metal of the ferrule 20a. This circumstance that the internal thread 22 is in phase with the two thread-like structures 23 and 12a is very advantageous, since it is directly useful in increasing the anchorage of the insert 20 in the workpiece 10 in the ultimate utilization of the composite article, as previously explained.

Referring now to FIG. 5, the article of manufacture 40 there illustrated is produced in accordance with the present method and essentially comprises the workpiece 10 having the tubular insert 20 anchored in the blind bore 11 formed in the workpiece 10, in the manner previously explained. The article 40 is adapted to be securely fastened to a cooperating part 50 that may be formed of metal by an associated screw 60 that may be formed of hard steel; which screw 60 comprises a slotted head 61 disposed in engagement with the exterior surface of the part 50 and a shank 62 extending through an opening 51 provided in the part 50 and thence into the insert 20. More particularly, the shank 62 of the screw 61 carries an external thread 63 that is received in and engaged by the internal thread 22 carried by the insert 20. In the arrangement, the internal thread 22 carried by the insert 20 in cooperating relation with the external thread 63 carried by the shank 62 of the screw 61 is exceedingly strong, and the cooperation between the complementary thread-like structures 12a and 23 provides a secure anchorage between the workpiece 10 and the insert 20; whereby the part 50 may be securely clamped to the workpiece 10 by the screw 60 in a highly satisfactory manner. Moreover, the external thread 63 carried by the shank 62 of the screw 60 may be of the same size and form as that which was initially received in the thread 12 provided in the workpiece 10, as previously described in conjunction with FIG. 1.

Referring now to FIG. 6, a modified form of the article of manufacture 40A is there illustrated that essentially comprises the workpiece 10 and an insert that is ultimately produced from a modified form of the ferrule 70a. In this case, the bore 11 that is provided in the workpiece 10 may extend entirely therethrough; and the ferrule 70a comprises a substantially cylindrical barrel 71 terminating at the outer end thereof in an outwardly directed flange or lip 72, the barrel 71 having an external diameter that is substantially the same as the minor diameter "D" of the internal thread-like structure 12a, as previously described in conjunction with FIG. 2. Further, a thread-like structure 73 is carried by the barrel 71 of the ferrule 70a immediately below the flange 72; which thread-like structure provides an external thread-like element 73a and an internal thread-like element 73b. More particularly, the external thread-like element 73a comprises at least one thread element of the pitch of the internal thread-like structure 12a and is adapted to be received thereby when the barrel 71 of the ferrule 70a is inserted into the bore 11. This arrangement insures that the ferrule 70a is retained in place in the bore 11 provided in the workpiece 10 with flange 72 in engagement with the adjacent outer surface of the workpiece 10, so as to prevent rotation of the ferrule 70a in the subsequent working thereof, utilizing the thread-swaging tap 30, as explained more fully below. Also, the internal thread-like element 73b is in phase with the external thread-like element 73a and is adapted to receive and to cooperate with the thread 33 provided on the tapered end of the thread-swaging tap 30.

More particularly, after the ferrule 70a has been secured in place in the bore 11 provided in the workpiece 10, the tapered end 32 of the thread-swaging tap 30 is inserted into the opening in the barrel 71 of the ferrule 70a and is pressed home and rotated carefully so as to cause the thread 33 on the tapered end of the shank 31 of the tap 30 properly to engage the internal thread-like element 73b. The tap 30 is then pressed home and further rotated, whereby the thread 33 carried by the shank 31 thereof coins the barrel 71 of the ferrule 70a into a corresponding insert 70.

In this modified form of the article 40A of FIG. 6, the insert 70 corresponds to the insert 20 in the form of the article 40 of FIG. 5; whereby it will, of course, be understood that the insert 70 is coined in place in the bore 11 in the manner previously explained, so as to provide the internal thread that is adapted to receive and to cooperate with the external thread carried by a screw, or the like, and so as to provide the external thread-like structure that is swaged in interlocked relation with the internal thread-like structure 12a provided in the workpiece 10; whereby the insert 70 is securely anchored in place in the workpiece 10 in a manner substantially identical to that previously described.

In view of the foregoing, it will be understood that in the present method of making the articles 40 and 40A, the metal of the ferrule 20a or 70a is coined in situ to produce the corresponding insert 20 or 70; whereby the metal of the ferrule 20a or 70a must be formed of a relatively soft metal relative to the material of the workpiece 10. Accordingly, the material of the workpiece 10 is normally selected from the class consisting of hard metals and hard organic resinous compositions. This class of hard metals normally includes cast iron, steel, aluminum, bronze, die cast zinc, etc.; while this class of hard organic resinous compositions include phenol-formaldehyde resin, methylmethacrylate resin, etc. The material of the ferrule 20a or 70a, from which the corresponding insert 20 or 70 is formed, is normally selected from the class consisting of steel and copper base alloys (brass and bronze), and within this class low carbon steels and stainless steels are ordinarily preferred. Stainless steel normally comprises those steels containing sufficient chromium to render the same corrosive-resistant, these steels normally containing at least about 10% chromium by weight. For example, the stainless steels employed may be selected from the series including Types 309, 414, 440 and 446.

Furthermore, the wall thickness of the ultimately produced insert 20 or 70 must be correlated with reference to the size of the screw that is to be employed in the anchorage of the workpiece 10; and in this connection, it is pointed out that the present method and resulting article of manufacture are very advantageous in the production of a strong threaded anchorage of the character described, utilizing relatively small screw sizes, particularly the small screw sizes of the Unified National Coarse (U.N.C.) Thread Series, as follows: #4–40; #5–40; #6–32; #8–32; #10–24; #12–24; #¼–20; #5⁄16–18; etc.

In producing the anchorage of the present invention in the workpiece 10 involving the range of screw sizes noted above, it has been determined that the optimum wall thickness of the insert 20 or 70 may be readily established by selecting the initial wall thickness of the ferrule 20a or 70a from which the insert 20 or 70 is coined in the present method, as previously explained. For example, in a series of tests involving the workpiece 10 formed of cast iron and the ferrule 20a formed of stainless steel (Type 305), and having an initial length of about 1½ times the major diameter of the thread 63 provided on the shank 62 of the screw 61 of size ¼–20, as described in conjunction with FIG. 5, it was determined that the initial wall thickness "Y" of the ferrule 20a should fall in the general range 0.012" to 0.022".

In conjunction with these tests noted above, it was established that the outside diameter of the ferrule 20a should be equal to the maximum thread diameter of the screw + about 0.002", and that the wall thickness of the ferrule 20a should be in the general range 49% to 54% of the thread depth of the screw, with an average value of about 53% of the thread depth of the screw. Thus, in this example, for the screw 61 of size ¼–20, it follows that the outside diameter of the ferrule 20a should be equal to 0.250"+0.002" or 0.252", and the wall thickness of the ferrule 20a should be equal to 0.032"×53% or 0.017". It follows that the inside diameter of the opening in the ferrule 20a should be equal to 0.252"–2(0.017") or 0.218". Accordingly, in the example of FIG. 3, the outside diameter "W" of the ferrule 20a should be equal to 0.252", the inside diameter "X" of the opening in the ferrule 20a should be 0.218", and the wall thickness "Y" of the ferrule 20a should be 0.017". With this arrangement, when the insert 20 is ultimately formed from the ferrule 20a, the internal thread 22 provided in the insert 20 produces a 75% threaded engagement with the external thread 63 carried by the shank 62 of the screw 60, as shown in FIG. 5.

In connection with these considerations, involving the hardness characteristic of the workpiece 10 and of the ferrule 20a, as well as the initial wall thickness "Y" of the ferrule 20a, the following general considerations are noted:

(1) If the material of the ferrule 20a is not substantially softer than the material of the workpiece 10, the ferrule 20a cannot be properly coined to produce the insert 20, as previously described.

(2) If the material of the ferrule 20a is "too soft," the resulting anchorage in the workpiece 10 will not be adequately reinforced.

(3) If the initial wall thickness "Y" of the ferrule 20a is "too thin," there is not adequate body or wall thickness in the resulting insert 20 to produce the desired reinforcement of the anchorage to the workpiece 10, since the internal thread 22 substantially cuts-through the wall of the resulting insert 20.

(4) If the initial wall thickness "Y" of the ferrule 20a is "too thick," there is not adequate depth of thread at the complementary thread-like structures 12a and 23 to provide a secure anchorage of the insert 20 in the bore 11 provided in the workpiece 10.

In view of the above description, it will be appreciated that while the optimum hardness of the ferrule 20a with respect to the known hardness of the workpiece 10, as well as the optimum wall thickness "Y" of the ferrule 20a, must be established empirically, these factors may be thus established in a simple manner so as to provide the previously described reinforced anchorage in the workpiece 10.

The combination of the workpiece formed of relative hard metal and the tubular insert, together with the particular thread arrangements, as an article of manufacture, is disclosed and claimed in the copending application of Simon S. Kahn, Serial No. 411,662, filed October 19, 1964.

In view of the foregoing, it is apparent that there has been provided an improved method of producing a strong threaded anchorage in a workpiece formed of relatively hard unyieldable metal that may be carried out in a simple and economical manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of producing a strong threaded anchorage in a workpiece formed of relatively hard metal, comprising providing an internal thread-like structure upon said workpiece interiorly of a substantially cylindrical bore formed therein, providing a ferrule formed of relatively soft metal characterized by plastic flow under swaging pressure and having a substantially cylindrical opening therein, frictionally securing said ferrule in place in said bore, and subjecting the interior surface of said ferrule to swaging pressure with an extremely hard thread-swaging member so as simultaneously to swage an internal thread upon the interior surface of said ferrule and to swage an external thread-like structure upon the exterior surface of said ferrule, wherein said thread-like structures are complementary and said external thread-like structure is swaged into interlocked frictional engagement with said internal thread-like structure so as securely to anchor said ferrule in place in said bore, said internal thread having a substantially constant major diameter that is greater than the initial diameter of said opening and a substantially constant minor diameter that is less than the initial diameter of said opening, said internal thread being adapted to receive and to engage a cooperating external thread carried upon the shank of a screw, or the like.

2. The method set forth in claim 1, wherein said internal thread has a substantially constant pitch diameter that is somewhat greater than the initial diameter of said opening.

3. The method set forth in claim 1, wherein said external thread-like structure has a substantially constant major diameter that is greater than the diameter of said bore and a substantially constant minor diameter that is substantially equal to the diameter of said bore.

4. The method set forth in claim 1, wherein said external thread-like structure has a substantially constant major diameter that is greater than the minor diameter of said internal thread-like structure and a substantially constant minor diameter that is less than the major diameter of said internal thread.

5. The method set forth in claim 1, wherein said ferrule has an initial wall thickness that is substantially less than the thread depth of said internal thread.

6. The method set forth in claim 1, wherein said ferrule has an initial wall thickness that is in the general range 49% to 54% of the thread depth of said internal thread.

7. The method of repairing a damaged initial internal thread provided upon a workpiece interiorly of a bore formed therein, wherein said workpiece is formed of relatively hard metal, comprising boring out at least a part of said damaged initial internal thread to produce an enlarged bore in said workpiece, retapping said workpiece to produce an enlarged internal thread-like structure internally of said enlarged bore, providing a ferrule formed of relatively soft metal characterized by plastic flow under swaging pressure and having a substantially cylindrical opening therein, frictionally securing said ferrule in place in said enlarged bore, and subjecting the interior surface of said ferrule to swaging pressure with an extremely hard thread-swaging member so as simultaneously to swage a final internal thread upon the interior surface of said ferrule and to swage an external thread-like structure upon the exterior surface of said ferrule, wherein said thread-like structures are complementary and said external thread-like structure is swaged into interlocked frictional engagement with said internal thread-like structure so as securely to anchor said ferrule in place in said enlarged bore, said final internal thread having a substantially constant major diameter that is greater than the initial diameter of said opening and a substantially constant minor diameter that is less than the initial diameter of said opening, whereby said final internal thread may have the same form and size as those of said damaged initial internal thread, said final internal thread being adapted to receive and to engage a cooperating external thread carried upon the shank of a screw, or the like.

8. The method of producing a strong threaded anchorage in a workpiece formed of relatively hard metal, comprising providing a blind bore in said workpiece, cutting an internal thread-like structure upon said work-piece interiorly of said blind bore, providing a ferrule formed of relatively soft metal characterized by plastic flow under swaging pressure and having a substantially cylindrical opening therein and also having a length that is somewhat less than the depth of said blind bore, securing said ferrule in place in the bottom of said blind bore so that at least one of the elements of said internal thread-like structure is exposed outwardly of the outer end of said ferrule, inserting an extremely hard thread-swaging member into the outer end of said blind bore and into the adjacent open outer end of said ferrule so that at least one of the elements of the external thread provided on the exterior surface of said thread-swaging member engages the adjacent exposed element of said internal thread-like structure, and simultaneously pressing home and rotating said thread-swaging member so as to cause the same to guide upon the exposed and engaged element of said internal thread-like structure and simultaneously to swage an internal thread upon the interior surface of said ferrule and to swage an external thread-like structure upon the exterior surface of said ferrule, wherein said thread-like structures are complementary and said external thread-like structure is swaged into interlocked frictional engagement with said internal thread-like structure so as securely to anchor said ferrule in place in said blind bore and wherein said thread-like structures and said internal thread have substantially the same pitch and are substantially in phase with each other, said internal thread having a substantially constant major diameter that is greater than the initial diameter of said opening and a substantially constant minor diameter that is less than the initial diameter of said opening, said internal thread being adapted to receive and to engage a cooperating external thread carried upon the shank of a screw, or the like.

9. The method of producing a strong threaded anchorage in a workpiece formed of relatively hard metal, comprising providing an internal thread-like structure upon said workpiece interiorly of a bore formed therein, providing a ferrule formed of relatively soft metal characterized by plastic flow under swaging pressure and having a substantially cylindrical opening therein, said ferrule also carrying at least one external thread-like element upon the exterior surface thereof and at least one internal thread-like element upon the interior surface thereof, said thread-like elements being disposed at one end of said ferrule and being of the same pitch and in phase with each other, said outer thread-like element also being of the same pitch as said internal thread-like structure, inserting said ferrule in the outer end of said bore and securing the same in place therein by frictional engagement between said external thread-like element and said internal thread-like structure, inserting an extremely hard thread-swaging member into the outer end of said bore and into the adjacent open one end of said ferrule so that at least one of the elements of the external thread provided on the exterior surface of said thread-swaging member engages said inner thread-like element, and simultaneously pressing home and rotating said thread-swaging member so as to cause the same to guide upon said inner thread-like element and simultaneously to swage an internal thread upon the interior surface of said ferrule and to swage an external thread-like structure upon the exterior surface of said ferrule, wherein said thread-like structures are complementary and said external thread-like structure is swaged into interlocked frictional engagement with said internal thread-like structure so as securely to anchor said ferrule in place in said bore and wherein said thread-like structures and said internal thread have substantially the same pitch and are substantially in phase with each other, said internal thread having a substantially constant major diameter that is greater than the initial diameter of said opening and a substantially constant minor diameter that is less than the initial diameter of said opening, said internal thread being adapted to receive and to engage a cooperating external thread carried upon the shank of a screw, or the like.

10. The method of producing a strong threaded anchorage in a workpiece provided with a hole therein, comprising providing an internal thread-like structure upon said workpiece interiorly of the hole therein, providing a fastener formed of relatively soft metal characterized by plastic flow under swaging pressure, said fastener including an elongated tubular barrel terminating at the outer end thereof in an enlarged head and having a substantially cylindrical opening extending from the exterior axially through said head and into said barrel, inserting said barrel into the hole in said workpiece and with said head in frictional engagement with the adjacent outer surface of said workpiece, inserting an elongated thread-swaging member from the exterior into the outer end of said opening and operating said thread-swaging member from the exterior to subject the interior surface of said barrel to swaging pressure so as to swage an internal thread thereupon, said subjecting of the internal surface of said barrel to swaging pressure also simultaneously swaging an external thread-like structure upon the exterior surface of said barrel, wherein said thread-like structures are complementary and said external thread-like structure is swaged into interlocked frictional engagement with said internal thread-like structure so as securely to anchor said barrel in place in the hole in said workpiece, said internal thread having a substantially constant major diameter that is greater than the initial diameter of said opening and a substantially constant minor diameter that is less than the initial diameter of said opening, said internal thread being adapted to receive and to engage a cooperating external thread carried upon the shank of a screw, or the like.

References Cited by the Examiner

UNITED STATES PATENTS

| | | | |
|---|---|---|---|
| 489,950 | 1/93 | Harrington | 29—523 |
| 2,216,833 | 10/40 | Barry | 29—523 |
| 2,254,924 | 9/41 | Williams. | |
| 2,407,553 | 9/46 | Hoesel. | |
| 2,936,014 | 5/60 | Kraus et al. | 151—41.74 |

FOREIGN PATENTS 231,272  4/25  Great Britain.

OTHER REFERENCES

Heli-Coil System (Bulletin No. 300), published by Aircraft Screw Products Co., Inc., June 15, 1946 (pages 2 and 3 relied on. Copy in Group 330, Class 29, Subclass 401).

WHITMORE A. WILTZ, *Primary Examiner.*

CARL W. TOMLIN, JOHN F. CAMPBELL, *Examiners.*